United States Patent
Schneider et al.

(10) Patent No.: US 9,920,786 B2
(45) Date of Patent: Mar. 20, 2018

(54) HYBRID SHAFT FOR MOTOR VEHICLES

(71) Applicant: Bayerische Motoren Werke Aktiengesellschaft, Munich (DE)

(72) Inventors: Franz Schneider, Munich (DE); Johannes Mintzlaff, Hoehenkirchen-Siegertsbrunn (DE); Wolfgang Streinz, Landshut (DE); Josef Hofstetter, Wimpasing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/574,491

(22) Filed: Dec. 18, 2014

(65) Prior Publication Data

US 2015/0105165 A1    Apr. 16, 2015

Related U.S. Application Data

(63) Continuation of application No. PCT/EP2013/059209, filed on May 3, 2013.

(30) Foreign Application Priority Data

Jun. 28, 2012   (DE) .................. 10 2012 211 115

(51) Int. Cl.
   *F16C 3/02* (2006.01)
(52) U.S. Cl.
   CPC .............. *F16C 3/026* (2013.01); *F16C 3/02* (2013.01); *F16C 2326/06* (2013.01)
(58) Field of Classification Search
   CPC .................. F16C 3/02; F16C 3/026
   USPC ............. 464/181, 183; 138/DIG. 2, DIG. 7; 264/DIG. 64
   See application file for complete search history.

(56) References Cited

U.S. PATENT DOCUMENTS

| 2,848,133 | A | * | 8/1958 | Ramberg | .............. B29C 53/602 138/DIG. 2 |
| 3,033,730 | A | * | 5/1962 | Martin | .................. B29C 70/446 138/DIG. 2 |
| 4,248,062 | A | | 2/1981 | McLain et al. | |
| 5,320,579 | A | | 6/1994 | Hoffmann | |

(Continued)

FOREIGN PATENT DOCUMENTS

| DE | 10 2007 036 435 A1 | 2/2009 |
| DE | 10 2007 036 436 A1 | 2/2009 |

(Continued)

OTHER PUBLICATIONS

How to Graph a Hyperbola, [online]. John Wiley & Sons, 2016 [retrieved on Feb. 25, 2016]. Retrieved from the Internet: <URL:www.dummies.com/how-to//content/how-to-graph-a-hyperbola>.*

(Continued)

*Primary Examiner* — Gregory J Binda
(74) *Attorney, Agent, or Firm* — Crowell & Moring LLP

(57) ABSTRACT

A hybrid shaft is provided, particularly a hybrid shaft for a vehicle, for transmitting a torque. The hybrid shaft includes a hollow shaft made of metal, wherein the hollow shaft has at least one reinforcement layer made of fiber-reinforced plastic on an outer surface of the hollow shaft in at least one reinforcement section. The hollow shaft has an external diameter varying in a longitudinal direction of the hollow shaft inside the at least one reinforcement section.

9 Claims, 4 Drawing Sheets

(56) References Cited

U.S. PATENT DOCUMENTS

| | | | |
|---|---|---|---|
| 6,001,018 | A | 12/1999 | Breese |
| 6,102,807 | A | 8/2000 | Barrett et al. |
| 6,336,986 | B1 | 1/2002 | Lee et al. |
| 2010/0109184 | A1* | 5/2010 | Schreiber .............. B29C 70/462 |
| 2012/0094777 | A1 | 4/2012 | Hechler-Stabbert et al. |

FOREIGN PATENT DOCUMENTS

| | | |
|---|---|---|
| DE | 10 2009 009 682 A1 | 8/2010 |
| EP | 2 444 633 A2 | 4/2012 |
| JP | 5-180213 A * | 7/1993 |
| SU | 329064 * | 2/1972 |

OTHER PUBLICATIONS

German Search Report dated Mar. 7, 2013, with English translation (ten (10) pages).
International Search Report (PCT/ISA/210) dated Jul. 16, 2013, with English translation (four (4) pages).

\* cited by examiner

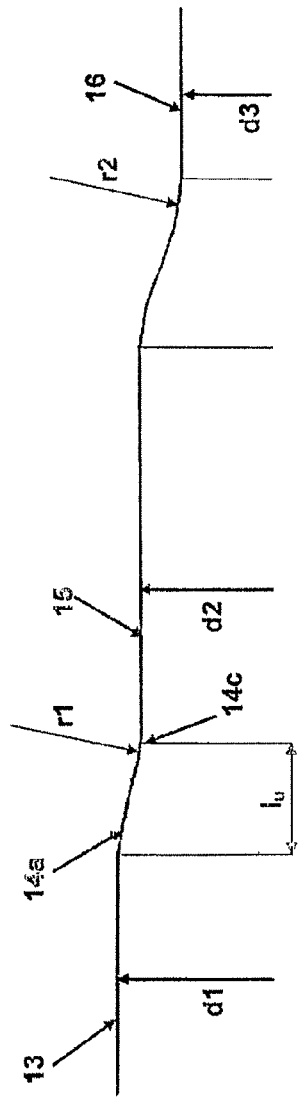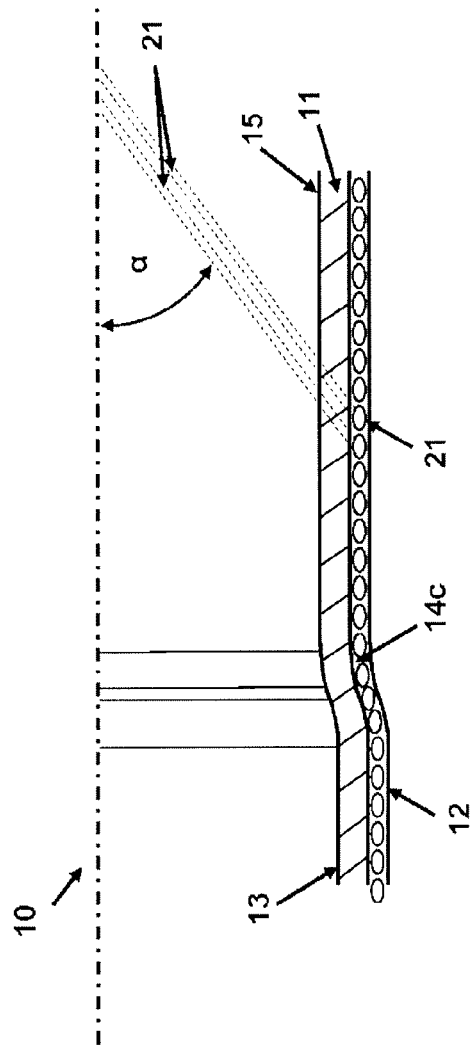
Fig. 2 (Detail A)
Fig. 3 (Detail B)

HYBRID SHAFT FOR MOTOR VEHICLES

CROSS REFERENCE TO RELATED APPLICATIONS

This application is a continuation of PCT International Application No. PCT/EP2013/059209, filed May 3, 2013, which claims priority under 35 U.S.C. § 119 from German Patent Application No. 10 2012 211 115.8, filed Jun. 28, 2012, the entire disclosures of which are herein expressly incorporated by reference.

BACKGROUND AND SUMMARY OF THE INVENTION

The invention relates to a hybrid shaft, particularly a hybrid drive shaft for a vehicle, for transmitting a torque.

In motor vehicles, drive shafts are used, for example, for transmitting a drive torque of a drive unit to a rear-axle transmission. For this purpose, the drive shaft should, on the one hand, have sufficient stability and durability as well as provide a geometric balance between the ends of the drive shaft. On one side, one end of the drive shaft is connected with the drive unit or a transmission assembly and, on the other side, with the rear-axle transmission, which are each disposed in an elastic manner and therefore movably with respect to one another.

In addition, the drive shaft is to be designed such that it is not excited to carry out vibrations in the critical range of its natural frequency by the high rotational operating speeds of up to 8,000 revolutions per minute (in the case of passenger cars). For this purpose, the drive shaft should have sufficient stiffness, so that its natural excitation frequency will be above a conceivable excitation by the rotational operating speed.

Drive shafts made of steel are therefore normally used, which are constructed in two parts for achieving sufficient stiffness and an optimal dimensioning of the demanded natural frequencies. This means that a connecting joint as well as a center bearing for the fastening and arrangement on the vehicle body are provided between the two shaft sections. This results in weight disadvantages as well additional stiffness demands on the vehicle body. In contrast, as a rule, a one-piece solution is not possible because of the required total length of approximately 1.5 to 2 m.

So-called "hybrid shafts" are therefore known from the prior art. These comprise a cylinder-shaped steel or aluminum shaft, which is covered over its length with a fiber-reinforced plastic material. This implementation permits a one-piece further development, so that the disadvantageous center bearing will not be necessary. In this case, the hybrid tube combines the high bending stiffness and the low weight of the fiber-reinforced plastic material with an advantageous production and a good torsional rigidity of the steel, so that a deflection of the shaft can be prevented and a high torsion moment can nevertheless be transmitted.

Thus, for example, U.S. Pat. No. 6,336,986 B1 illustrates a hybrid shaft having a cylindrical metal tube and a layer made of a fiber composite material applied to the metal tube, which material is additionally coated. DE 10 2007 036 436 A1 also describes a hybrid shaft having a hollow shaft made of metal and having a layer of carbon fibers which are arranged unidirectionally parallel to the longitudinal direction of the hollow shaft. In both cases, the metal tube has a uniform cross-section or diameter along its longitudinal dimension.

All such drive shafts have the disadvantage that a compromise has to be found between a diameter, which is as small as possible, because of the, as a rule, very limited installation space, on the one hand, which especially in the area of a vehicle underbody may locally be very limited because of a plurality of additional vehicle components, and a diameter of the drive shaft, which is as large as possible, on the other hand, and is required for a raising of the natural frequency—if possible, beyond the normally occurring excitation frequencies.

It is therefore an object of the invention to provide a hybrid shaft which, while its own weight is low, has a high stiffness and, simultaneously, a space-saving construction and is nevertheless optimally designed with respect to its natural frequencies.

This and other objects are achieved by a hybrid shaft, particularly a hybrid drive shaft for a vehicle, for transmitting a torque. The hybrid shaft has a hollow shaft made of metal. The hollow shaft comprises at least one reinforcement layer made of fiber-reinforced plastic material applied to an outer surface of the hollow shaft in at least one reinforcement section. The hollow shaft has an external diameter, which varies in a longitudinal direction of the hollow shaft, within the at least one reinforcement section.

The hybrid construction of the hybrid shaft, on the one hand, permits a considerable weight reduction while simultaneously achieving high stiffness. This offers the possibility of constructing the hybrid shaft clearly longer than pure steel shafts, in the case of passenger cars, as a rule, therefore in one piece. Instead of a thick-walled metal tube with sufficient bending and torsional rigidity, in the case of a hybrid shaft, a comparatively thin-walled metal tube can be used, which is sufficiently dimensioned for a transmission of the occurring torsional forces as a result of the torques to be transmitted. However, a sufficient bending stiffness for the hollow shaft itself is not required but is provided by the reinforcement layer made of fiber-reinforced plastic material. The heavy metallic part (hollow shaft) therefore may be designed to be smaller and, as a result, clearly lighter than in the case of a purely metallic drive shaft. Steel, aluminum or other suitable metallic materials, for example, can be used as metals. Suitable reinforcement fibers comprise, for example, carbon, glass, graphite and/or aramid fibers. In addition, because of the hybrid construction, expenditures of material of the comparatively expensive fiber composite material and therefore the manufacturing costs can be minimized compared with pure fiber composite shafts. The reinforcement section may be applied to the exterior surface of the hybrid shaft completely or only in one or more partial sections.

A varying diameter is a cross-section which changes in the longitudinal direction of the hybrid shaft or the hollow shaft. This variation may, for example, be a change of cross-section that is stepped in the longitudinal direction or has no steps and is continuous in the longitudinal direction. Particularly several successive changes of the cross-section in the longitudinal direction are contemplated.

The following representation will take place by means of circular cross-sections of the hybrid shaft with, in each case, an external diameter of a different size. Naturally also other suitable shapes of cross-sections are conceivable for the hollow shaft. The selected term "diameter" in this case should be understood correspondingly in an analogous application.

The variation of the external diameter along the longitudinal dimension of the hollow shaft, among other things, permits an adaptation to installation-space-caused situations, particularly local narrow locations. Particularly in the case of motor vehicles, a drive shaft constructed in this fashion usually extends in the area of a vehicle underbody in which, in addition, a plurality of further vehicle components are arranged, whereby the available installation space is limited, as described above. The described hybrid shaft can therefore be constructed to be reduced in its cross-section in particularly narrow locations. In this case, the reduced small cross-section should naturally be selected such that a transmission of the maximal torque to be expected will continue to be possible.

On the other hand, this further development advantageously permits the providing of a locally greater cross-section in locations with a more generous amount of space. An improved bending stiffness and a targeted adaptation of a natural frequency of the entire hybrid shaft can therefore be provided for the entire hybrid shaft. As a result, a clearly more rigid shaft can be provided than would be possible by means of a known hybrid shaft which only has a continuous hollow shaft with a constant external diameter.

According to an embodiment, the hollow shaft includes a first section with a first external diameter and a second section with a second external diameter within the at least one reinforcement section. The first external diameter is not equal to the second external diameter, and the first section and the second section are connected with one another by way of a transition section.

The first external diameter can therefore be larger or smaller than the second external diameter. In the following, the first external diameter is to be larger than the second external diameter. However, this is only a definition selected as an example, so that the reverse case is also possible. In that case, the corresponding definitions of the first section or the first external diameter and of the second section or the second external diameter should then be correspondingly exchanged.

For example, in the simplest case, the hollow shaft may comprise two cylindrical sections which are connected with one another by the transition section. It is understood that a plurality of first and second sections may also be provided, which are each connected with one another by a respective transition section and each have a different diameter with respect to the adjacent section.

The transition section may be designed such that an outer surface area of the transition section has a continuously curved transition to an outer surface area of the smaller second section.

As a result of the construction, this transition has a contour course extending in the longitudinal direction of the hollow shaft and having an obtuse angle, thus an outer angle larger than 90° and smaller than 180°. A placing of a common reinforcement layer on the two surface areas harbors the risk of trapped air or even of a lifting-off of the reinforcement layer from the entire hollow-shaft surface, but especially in the area of the transition, because of the described obtuse angle. In this case, among other things, a certain natural stiffness of the reinforcement layer made of fiber-reinforced plastic plays a decisive role, whereby the reinforcement layer cannot arbitrarily be shaped and reliably applied onto a multi-dimensionally curved shape of the surface area of the hollow shaft. The consequence of the resulting lifting-off is a weakening of the reinforcement and therefore a local weakening of the entire hybrid shaft.

The described continuously curved transition especially between the surface area of the transition section and the surface area of the second section of the hollow shaft therefore makes it possible, as a result of the suggested continuously curved shaping, to advantageously securely apply the reinforcement layer made of fiber-reinforced plastic material. In particular, a close fitting of the reinforcement layer on the outer surface of the hollow shaft is made possible also in the area of the curvature, and the hollow shaft is continuously and reliably reinforced.

According to a further embodiment, the continuously curved transition comprises a hyperbolic transition with a concave curvature radius.

A "hyperbolic" transition is particularly a hyperboloid-shaped form, which is also called "anticlastic" and has a negative curvature measurement. In other words, the transition is further developed as a rotation hyperboloid at least between the transition section and the second section of the hollow shaft. In the following, an example will be described in the figures.

Because of an outer angle of the pertaining contour course of more than 180°, a transition between the first section with the larger diameter and the transition area is to be considered to be less critical and may therefore be constructed to be discontinuous or also with a continuous curvature (with an opposed curvature).

The reinforcement layer may, for example, comprise rovings wound around the hollow shaft. The rovings are applied to the hollow shaft by being wound around. Methods of forming the reinforcement layer by use of rovings are known, so that they do not have to be further discussed.

According to an embodiment, the rovings are oriented at a winding angle of 10° to 20°, preferably 10° to 15°, with respect to the longitudinal direction of the hollow shaft. Since the reinforcement layer has to transmit no torque, the winding angle of the rovings can be kept small or flat. On the one hand, such a flat winding angle has an advantageous effect on a bending stiffness of the hybrid shaft that is to be as high as possible and, in addition, has the effect that the rovings are curved with a greater bending radius around the shaft than in the case of a larger or steeper winding angle. This is significant particularly in the area of the transition range, however, mainly in the transition between the transition range and the second smaller section of the hollow shaft, so that, as a result, a lifting-off of the fibers or of the reinforcement layer from the hollow shaft can be reduced or even prevented.

A combination of such a flat winding angle of the rovings and the hyperbolic transition is therefore particularly advantageous. Since a rotation hyperboloid as a geometric shape can be formed in the case of a torsional rotation about a longitudinal axis from rods formed parallel to one another, this can be transferred in an analogous application to the rovings. The latter are also arranged to be oriented parallel to one another and are rotated about the flat winding angle with respect to the longitudinal axis of the hollow shaft, so that the rovings also form a hyperboloid-shaped body (which corresponds to the reinforcement layer). Graphically, the latter is placed on the also hyperbolic transition of the hollow shaft. This has the advantage that, because of their arrangement and mutual rotation (winding angle), the rovings already essentially follow the analogous hyperbolic course of the surface area and, in this manner, are curved only to a slight or minimal extent in their own longitudinal dimension.

Summarizing, a flat and simultaneously reliable close fitting on the hollow shaft is caused, also in the transition area or of the transition to the smaller second section of the hollow shaft. A lifting-off of the reinforcement layer can thereby be avoided and, despite a diameter that varies along the longitudinal direction, the hybrid shaft can be reliably reinforced with the reinforcement layer especially in these areas.

According to an embodiment used as an example, the hybrid shaft may have a hollow shaft with a first section and a second section, the first section having an external diameter of approximately 75 mm, and the second section having a diameter of approximately 70 mm. The transition area, for example, also encompasses a length of 5 to 10 cm.

According to an embodiment, the concave curvature radius may have a value of between 0.8 m and 1.2 m.

Furthermore, the hybrid shaft may include at least one crash element for absorbing deformation energy in the longitudinal direction of the hollow shaft. The crash element is, for example, further developed as a so-called insertion element such that a first part of the hollow shaft having a small diameter is inserted into a further part having a larger diameter when a defined force acts in the longitudinal direction of the hollow shaft, as, for example, in the event of a crash, particularly a frontal crash. In contrast to a pure fiber composite shaft, by means of the suggested hybrid shaft, a crash-related capability can be provided by way of the inventive hybrid shaft because of the hollow shaft made of metal.

On at least one of its two ends, the hybrid shaft may, in addition, include an attachment part, thus, for example, a joint, a flange, a sliding piece or the like, for the torque-transmitting linking of the hybrid shaft or balancing plates. These attachment parts are preferably connected with the metallic hollow shaft in a material-bonding manner, particularly welded or glued together. For this purpose, the hollow shaft is further developed such that one end or both ends of the hollow shaft are not covered by the reinforcement layer, thus are not wrapped by windings but project beyond the reinforcement layer, so that a connection with the respective attachment part can be achieved in a simple manner.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 is a first schematic view of a detail section A of FIG. 1; and

FIG. 3 is a second schematic view of a detail section B of FIG. 1.

DETAILED DESCRIPTION OF THE DRAWINGS

Figure 1:
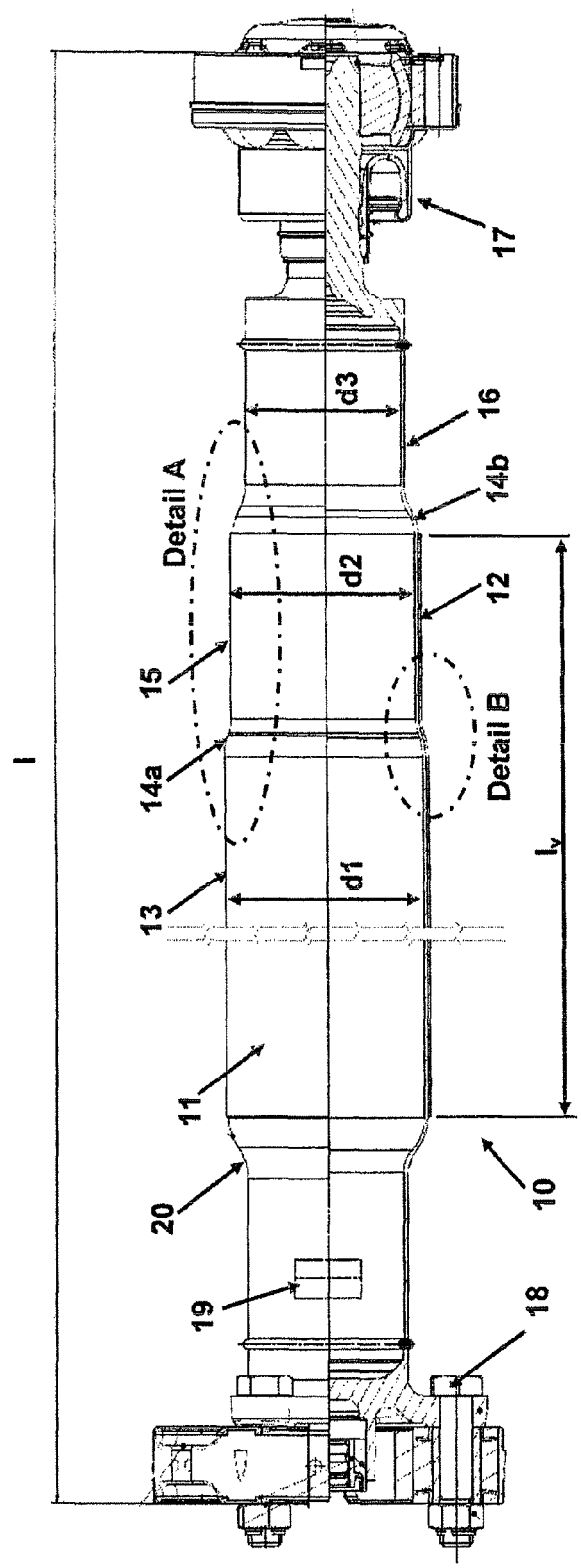
FIG. 1 is a partial sectional view of a hybrid shaft according to an embodiment the invention.

In its upper half, FIG. 1 shows a hybrid shaft 10 in an exterior view and, in its lower half, shows the hybrid shaft in a longitudinal sectional view. The hybrid shaft 10 may, for example, be a hybrid shaft for a vehicle (not shown). For transmitting a torque, the hybrid shaft includes a hollow shaft 11 made of metal. The metal hollow shaft 11 includes several cylindrical tube sections, among others, a first section 13, a second section 15 as well as a third section 16. These sections are each connected with the respectively adjacent section by way of a transition section 14a, 14b and each have a different diameter d1, d2, d3, so that the hollow shaft 11 has an external diameter that varies in a longitudinal direction of the hollow shaft 11. The sections 13 and 15 as well as the transition section 14a connecting the two sections 13, 15, are wrapped with a common reinforcement section 12 of the length $l_v$, made of fiber-reinforced plastic. Section 13 has the larger diameter d1 with respect to section 15 with the smaller diameter d2.

The sections may be arranged such that they are adapted to an available installation space of a vehicle and therefore optimally utilize the latter in order to be able to provide a stiffness that is as high as possible despite limited space conditions.

In addition and only optionally, the hybrid shaft 10 may include one attachment part respectively on its two opposite ends, for example, a length compensation device 17 and/or a flange 18. A balancing plate 19 may also optionally be fastened to the hybrid shaft 10.

As also outlined in FIG. 1, the hybrid shaft 10 may have several sections, each with their own diameter. That the reinforcement section is arranged only in the two sections 13 and 15 as well as in the transition section 14 represents an example, but should not be understood to be limiting. It is also contemplated to provide a common reinforcement section which also encloses one or more of the other sections.

As illustrated in FIG. 2 in detail section A (compare FIG. 1) by means of a contour course of the hollow shaft 11 in the longitudinal direction of the hybrid shaft, the transition section 14a has a length $l_u$ and is designed such that an outer surface area of the transition section 14a has a continuously curved transition 14c to an outer surface area of the smaller second section 15. The continuously curved transition 14c is designed as a hyperbolic transition with a concave curvature radius r1. A similar concave curvature radius r2 extends to diameter d3. These transitions also serve as the aforementioned crash elements.

Figure 4:
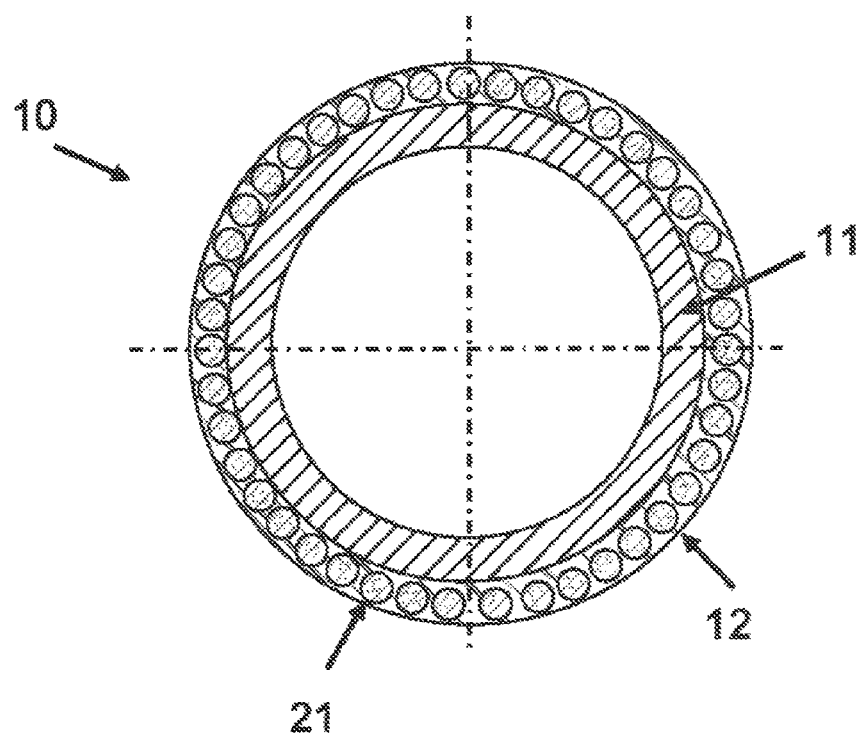
FIG. 4 is a schematic transverse cross-section view of the hybrid shaft of FIG. 1.
Figure 5:
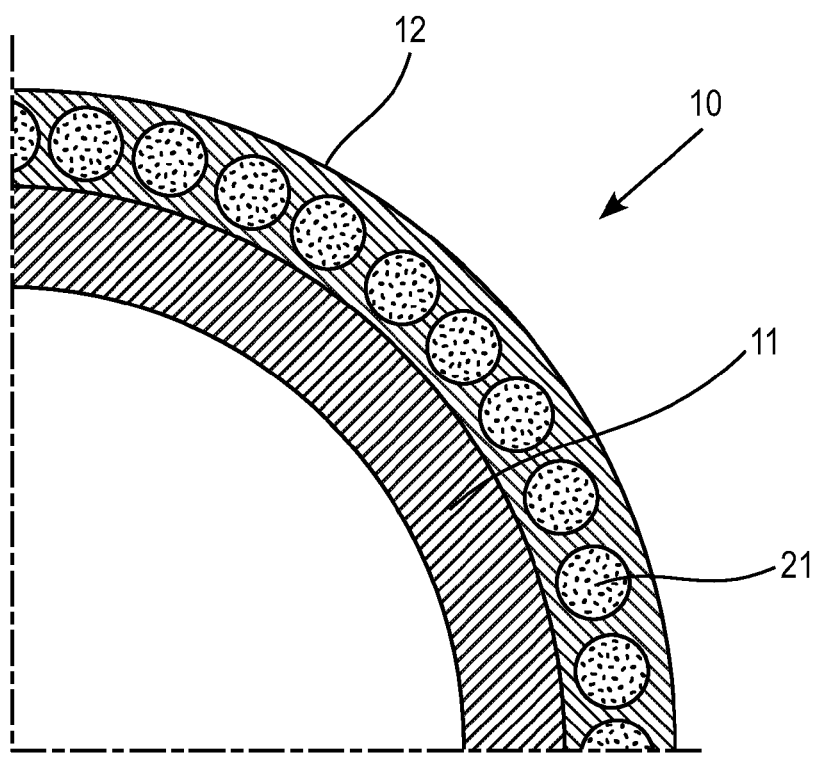
FIG. 5 is an enlarged view of a portion of the cross-section view of FIG. 4.

In connection with a flat winding angle α of rovings 21 of the reinforcement layer 12, this results in a reinforcement layer 12 which rests as optimally and flatly as possible on the hollow shaft (sections 13, 15, 14a), as shown for example in FIGS. 4 and 5 (FIG. 5 is an enlarged view of a portion of the FIG. 4 cross-section). The rovings winding angle may be 10° to 20°, preferably 10° to 15°, with respect to the longitudinal direction of the hollow shaft. In this manner, according to the view of detail section B in FIG. 3 (compare FIG. 1), trapped air and detachments of the reinforcement layer 12 can be avoided particularly in the area of the transition of the transition section 14a to the second smaller section 15.

According to an exemplary embodiment, the diameter d1 amounts to approximately 75 mm; the diameter d2 amounts to approximately 70 mm; the length $l_u$ of the transition section amounts to between 50 and 100 mm, and the curvature radius r1 amounts to between 800 and 1,200 mm, particularly approximately 1,000 mm.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A hybrid shaft for transmitting a torque, comprising:
a hollow shaft made of metal;

at least one reinforcement layer, made of fiber-reinforced plastic, on an outer surface of the hollow shaft in at least one reinforcement section, wherein the hollow shaft has an external diameter varying in a longitudinal direction of the hollow shaft within the at least one reinforcement section with a first section having a first external diameter and a second section having a second external diameter connected with one another via a transition section, the first external diameter being larger than the second external diameter, and the transition section is configured to have an outer surface area providing a continuously curved transition at each end of the transition section to an outer surface area of the second section having the smaller second external diameter.

2. The hybrid shaft according to claim 1, wherein the at least one reinforcement layer comprises rovings wound around the hollow shaft.

3. The hybrid shaft according to claim 2, wherein the rovings are oriented at a winding angle of 10° to 20° with respect to the longitudinal direction of the hollow shaft.

4. The hybrid shaft according to claim 3, wherein the transition section has a length of 5 to 10 centimeters.

5. The hybrid shaft according to claim 4, wherein the continuously curved transition has a concave curvature radius has a value of between 0.8 meters and 1.2 meters.

6. The hybrid shaft according to claim 2 wherein the rovings are oriented at a winding angle of 10° to 15° with respect to the longitudinal direction of the hollow shaft.

7. The hybrid shaft according to claim 1, wherein the transition section has a length of 5 to 10 centimeters.

8. The hybrid shaft according to claim 1, wherein the continuously curved transition has a concave curvature radius has a value of between 0.8 meters and 1.2 meters.

9. The hybrid shaft according to claim 1, further comprising:

a crash element configured to absorb deformation energy in the longitudinal direction of the hollow shaft.

* * * * *